W. SADLER.
Preserving Meat.

No. 63,432.  Patented April 2, 1867

Witnesses:
A. M. Tanner
Nathan K. Ellsworth

Inventor:
Warren Sadler
by Munn & Co
Attorneys
Per O. Knight

United States Patent Office.

WARREN SADLER, OF LOCKPORT, NEW YORK.

Letters Patent No. 63,432, dated April 2, 1867.

---

IMPROVED DEVICE FOR SALTING AND SEASONING MEATS.

---

The Schedule referred to in these Letters Patent and making part of the same.

---

TO ALL WHOM IT MAY CONCERN:

Be it known that I, WARREN SADLER, of Lockport, in the county of Niagara, State of New York, have invented a new and useful Instrument for Salting and Seasoning Meat; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which the same letters indicate similar parts.

Figure 1:
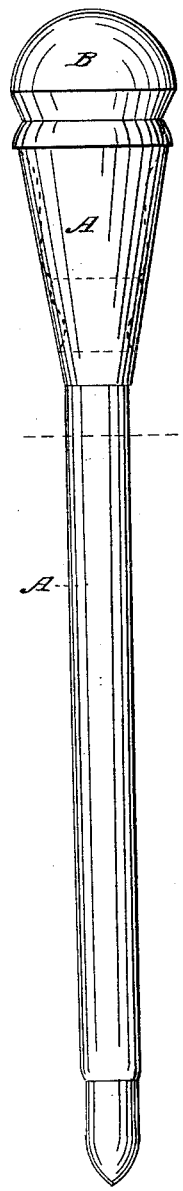
Figure 1 is an elevation of instrument.
Figure 2:
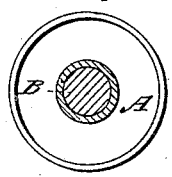
Figure 2 is a transverse section on the line $a\ x$, fig. 1.
Figure 3:
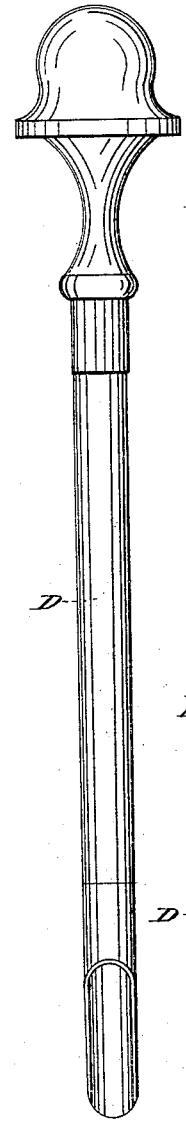
Figure 3 is an elevation of the tube by which the salt is introduced.
Figure 4:
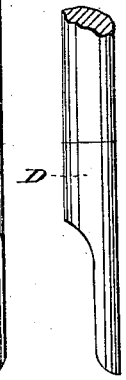
Figure 4 is a side view of one end of the salt-holder. This consists of a tubular portion, through which a probe is introduced to make an opening to the middle or to the bone of the meat, and which subsequently forms the duct for the introduction of the scoop which carries the salt and deposits it against the bone, where decay usually commences.

In the drawings, A represents a thin metallic tube, containing B, the handle, and C, the point of the probe, which show at the respective ends of the tube A, and the latter of which affords the means for the penetration of the meat. The desired point being reached, the scoop D is filled with salt, or a sufficient quantity placed therein, and the scoop thus furnished is introduced through the tube A so as to protrude at the end and deposit the salt at the required place, when the scoop and tube are withdrawn together.

The difficulty in salting meat usually arises from its imperfect penetration, and the parts around the bone are generally the points at which the decay commences, owing to their being deep-seated, full of moisture, and apparently more apt to decay than the exterior parts.

Having described my invention, what I claim as new, and desire to secure by Letters Patent, is—

The instrument as shown and described, consisting of the tube A, probe C, and scoop D, operating as set forth.

To the above specification of my device for salting and seasoning meats, I have signed my hand this twenty-first day of February, 1867.

WARREN SADLER.

Witnesses:
 EDWARD H. KNIGHT,
 GEO. W. ROTHWELL.